(12) United States Patent
Hosokawa

(10) Patent No.: US 10,061,639 B2
(45) Date of Patent: Aug. 28, 2018

(54) INFORMATION PROCESSING DEVICE, DEFECT CAUSE SPECIFYING METHOD

(71) Applicant: Panasonic Intellectual Property Management Co., Ltd., Osaka (JP)

(72) Inventor: Shuya Hosokawa, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 146 days.

(21) Appl. No.: 15/204,023

(22) Filed: Jul. 7, 2016

(65) Prior Publication Data

US 2017/0068589 A1  Mar. 9, 2017

(30) Foreign Application Priority Data

Sep. 7, 2015 (JP) .................................. 2015-176039

(51) Int. Cl.
| | | |
|---|---|---|
| G06F 11/00 | (2006.01) | |
| G06F 11/07 | (2006.01) | |
| G06Q 10/00 | (2012.01) | |
| G06Q 30/00 | (2012.01) | |

(52) U.S. Cl.
CPC ........ G06F 11/0793 (2013.01); G06F 11/079 (2013.01); G06F 11/0721 (2013.01); G06Q 10/20 (2013.01); G06Q 30/016 (2013.01)

(58) Field of Classification Search
CPC .............. G06F 11/0721; G06F 11/079; G06F 11/0793; G06Q 10/20; G06Q 30/016
See application file for complete search history.

(56) References Cited

U.S. PATENT DOCUMENTS

| | | | | |
|---|---|---|---|---|
| 5,239,487 A | * | 8/1993 | Horejsi ................. | G06Q 10/06 702/184 |
| 5,532,927 A | * | 7/1996 | Pink .................... | G01R 31/007 701/29.7 |
| 2004/0100650 A1 | * | 5/2004 | Landau ................. | H04L 41/22 358/1.14 |
| 2005/0222882 A1 | | 10/2005 | Aoki et al. | |

(Continued)

FOREIGN PATENT DOCUMENTS

| | | |
|---|---|---|
| EP | 2908281 | 8/2015 |
| JP | 6-103073 | 4/1994 |

OTHER PUBLICATIONS

The European Search Report dated Dec. 2, 2016 for the related European Patent Application No. 16177687.7.

*Primary Examiner* — Joshua P Lottich
(74) *Attorney, Agent, or Firm* — Greenblum & Bernstein, P.L.C.

(57) ABSTRACT

An information processing device includes a question provider that outputs questions for specifying a cause of a defect of a device or a countermeasure for the cause of the defect, a response receiver that receives responses to the questions output by the question provider, a defect cause specifier that specifies the cause of the defect of the device or the countermeasure for the cause of the defect on the basis of the responses received by the response receiver, and an operation history information receiver that receives operation history information of the device. The question provider varying the questions that are to be output, on the basis of the operation history information received by the operation history information receiver.

6 Claims, 16 Drawing Sheets

(56) References Cited

U.S. PATENT DOCUMENTS

| | | | |
|---|---|---|---|
| 2009/0049344 A1* | 2/2009 | Kawamura | F24D 19/1051 |
| | | | 714/46 |
| 2010/0047754 A1* | 2/2010 | Metz, Jr. | G09B 7/00 |
| | | | 434/322 |
| 2010/0153790 A1* | 6/2010 | Matsumoto | G06F 11/2257 |
| | | | 714/47.2 |
| 2011/0153387 A1 | 6/2011 | Ma | |
| 2012/0191496 A1* | 7/2012 | Muench | G06Q 10/063 |
| | | | 705/7.13 |
| 2014/0214622 A1* | 7/2014 | Kaneko | G06Q 30/0625 |
| | | | 705/26.62 |
| 2014/0324276 A1* | 10/2014 | Weaks | G06Q 10/063 |
| | | | 701/31.4 |
| 2015/0206357 A1* | 7/2015 | Chen | G07C 5/008 |
| | | | 701/31.4 |
| 2016/0306691 A1* | 10/2016 | Aneja | G06F 17/30864 |

* cited by examiner

FIG. 6

| CUMULATIVE NUMBER OF OPERATIONS | AAA (TIMES) |
|---|---|
| CUMULATIVE OPERATION TIME | BBB (MINUTES) |
| PREVIOUS OPERATION MODE | C |
| STEP 1 REQUIRED TIME | DD (MINUTES) |
| STEP 2 REQUIRED TIME | EE (MINUTES) |
| STEP 3 REQUIRED TIME | FF (MINUTES) |
| SENSOR A TEMPERATURE | GG (°C) |
| SENSOR B TEMPERATURE | HH (°C) |

FIG. 17

| CUMULATIVE NUMBER OF OPERATION DAYS | AAA (DAYS) |
|---|---|
| INTERIOR TEMPERATURE 1 | BB (°C) |
| INTERIOR TEMPERATURE 2 | CC (°C) |
| INTERIOR TEMPERATURE 3 | DD (°C) |
| DOOR 1 OPEN/CLOSE COUNT | EE (TIMES/DAY) |
| DOOR 2 OPEN/CLOSE COUNT | FF (TIMES/DAY) |
| DEVICE 1 CUMULATIVE NUMBER OF OPERATIONS | GG (TIMES/DAY) |
| DEVICE 2 CUMULATIVE NUMBER OF OPERATIONS | HH (TIMES/DAY) |

INFORMATION PROCESSING DEVICE, DEFECT CAUSE SPECIFYING METHOD

BACKGROUND

1. Technical Field

The present disclosure relates to an information processing device and a defect cause specifying method for specifying the cause of a defect of a device or a countermeasure for the cause of a defect.

2. Description of the Related Art

Conventionally, when a household electrical appliance such as a refrigerator or an air conditioner has a fault, a user makes a telephone call to a call center of the manufacturer, asks an operator about a countermeasure method for the fault, and carries out a prescribed operation or puts the household electrical appliance in for repair or the like to handle the fault.

Furthermore, techniques for performing a fault diagnosis more efficiently have been proposed in unexamined patent application publications, and, for example, Japanese Unexamined Patent Application Publication No. 6-103073 discloses a system in which the user is asked plurality of question items and a fault is diagnosed according to the responses thereto.

Specifically, in the technique of Japanese Unexamined Patent Application Publication No. 6-103073, question items are prepared in a tree form and a priority is given to each question item. For example, a concluding event 1 is established in the case where all of the questions of question items of three priorities from priority 1 are established; however; if even one question from among the priorities 1 to 3 becomes unnecessary, the questions thereafter are not asked.

SUMMARY

However, the technique described in Japanese Unexamined Patent Application Publication No. 6-103073 is insufficient in the case where, when carrying out a fault diagnosis, the fault diagnosis can be made according to the response to a certain question item without responding to the following question items thereafter. In addition, the technique described in Japanese Unexamined Patent Application Publication No. 6-103073 is unable to handle the case where a fault diagnosis cannot be carried out unless responses are obtained for all of the plurality of question items.

Furthermore, the technique described in Japanese Unexamined Patent Application Publication No. 6-103073 gives no consideration whatsoever to how a response to a certain question item from among a plurality of questions items is to be obtained without requesting a response to be made by means of key input or the like from the user, and it is necessary to make it possible to carry out a fault diagnosis, specify the cause of a defect, and so forth in a more efficient manner.

It is preferable that the number of question items for the user be reduced by automatically acquiring responses to certain questions items by a method of some sort so as to not ask questions to the user in relation to those responses.

In one general aspect, the techniques disclosed here feature an information processing device includes a question provider that outputs questions for specifying a cause of a defect of a device or a countermeasure for the cause of the defect, a response receiver that receives responses to the questions output by the question provider, a defect cause specifier that specifies the cause of the defect of the device or the countermeasure for the cause of the defect on the basis of the responses received by the response receiver, and an operation history information receiver that receives operation history information of the device. The question provider varying the questions that are to be output, on the basis of the operation history information received by the operation history information receiver.

According to the present disclosure, it is possible to reduce the number of times that questions are asked to the user, and it is possible to shorten the time taken to specify the cause of a defect or to specify a countermeasure for the cause of the defect.

Furthermore, since the number of times that questions are asked to the user is reduced, it is possible to alleviate the user feeling irritated by a troublesome response operation as much as possible.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 is a drawing depicting operation history information in embodiment 1 of the present disclosure;

FIG. 17 is a drawing depicting operation history information in embodiment 4 of the present disclosure.

DETAILED DESCRIPTION

Figure 1:
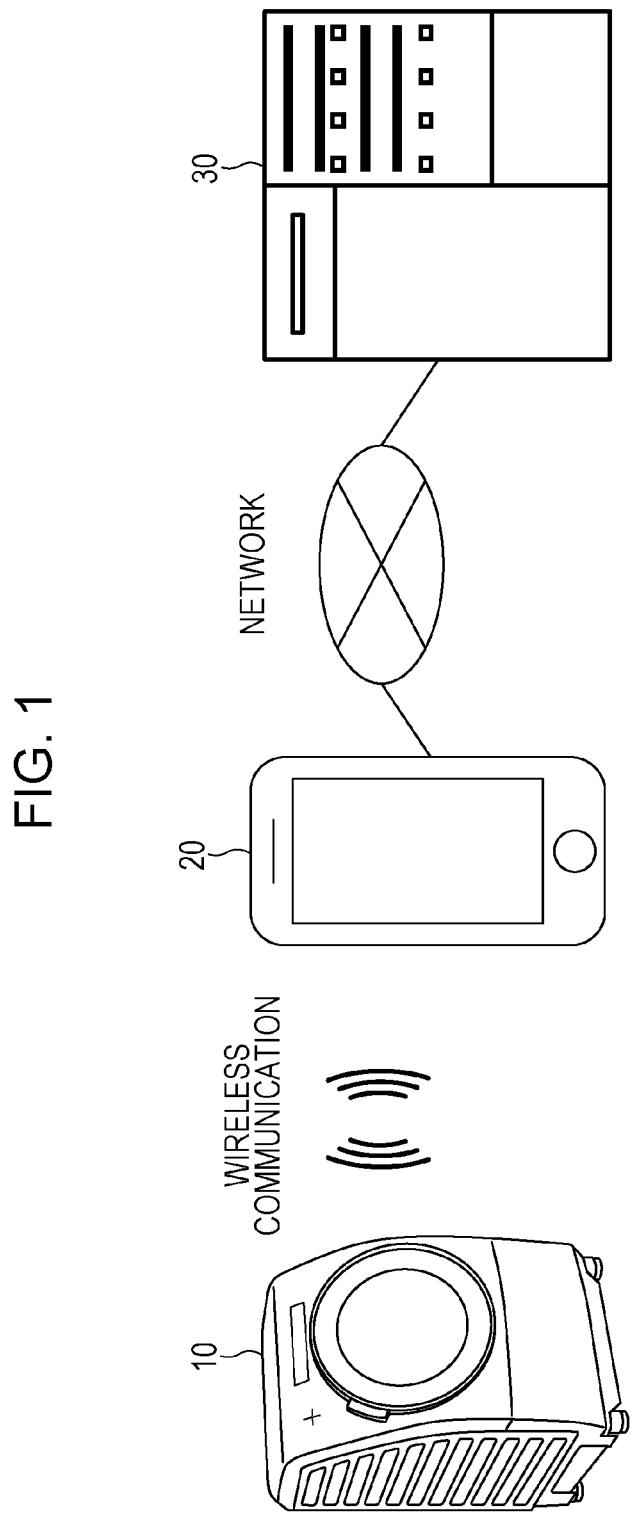
FIG. 1 is a system configuration diagram in embodiment 1 of the present disclosure.

A first aspect of the present disclosure is an information processing device includes a question provider that outputs questions for specifying a cause of a defect of a device or a countermeasure for the cause of the defect, a response receiver that receives responses to the questions output by the question provider, a defect cause specifier that specifies the cause of the defect of the device or the countermeasure for the cause of the defect on the basis of the responses received by the response receiver, and an operation history information receiver that receives operation history information of the device. The question provider varying the questions that are to be output, on the basis of the operation history information received by the operation history information receiver.

It thereby becomes possible for the question provider to reduce the questions to be output and to reduce the number of questions to be responded to by the user, on the basis of the operation history information received by the history information receiver.

A second aspect of the present disclosure is the information processing device according to the first aspect, in which the question provider does not output unnecessary questions from among the questions that are to be output, on the basis of the operation history information received by the history information receiver.

It thereby becomes possible to automatically exclude questions for which responses to the questions are known, on the basis of the operation history, from among the questions to be output, and to reduce the number of questions to be responded to by the user.

A third aspect of the present disclosure is the information processing device according to the first or second aspect, provided with a storage that stores questions corresponding to the content of the operation history information.

A fourth aspect of the present disclosure is the information processing device according to the first or second aspect, provided with a storage that stores a plurality of questions that can be expressed in a tree form, the question provider prohibiting output of questions for which a response result can be determined, from the plurality of questions stored in the storage, on the basis of the operation history information received by the history information receiver, and outputting the remaining plurality of questions.

It thereby becomes possible to automatically exclude questions for which responses to the questions are known, on the basis of the operation history, from among the questions to be output, and to reduce the number of questions to be responded to by the user.

A fifth aspect of the present disclosure is a defect cause specifying method for specifying a cause of a defect of a device or a countermeasure for the cause of the defect on the basis of responses to a plurality of questions, the method including the steps of: asking the questions on the basis of operation history information of the device; receiving the responses to the questions asked; and specifying the cause of the defect of the device or the countermeasure for the cause of the defect on the basis of the content of the responses received.

It thereby becomes possible to automatically exclude questions for which responses to the questions are known, on the basis of the operation history, from among the questions to be output, and to reduce the number of questions to be responded to by the user.

A sixth aspect of the present disclosure is a defect cause specifying method for specifying a cause of a defect of a device or a countermeasure for the cause of the defect on the basis of responses to a plurality of questions, the method including the steps of: outputting only necessary questions from the plurality of questions on the basis of operation history information of the device; receiving the responses to the questions output; and specifying the cause of the defect of the device or the countermeasure for the cause of the defect on the basis of the content of the responses received.

It thereby becomes possible to automatically exclude questions for which responses to the questions are known, on the basis of the operation history, from among the questions to be output, and to reduce the number of questions to be responded to by the user.

A seventh aspect of the present disclosure is a defect cause specifying method for specifying a cause of a defect of a device or a countermeasure for the cause of the defect on the basis of responses to a plurality of questions, the method including the steps of: determining whether or not there is a question for which a response to the question can be decided without asking the question, on the basis of operation history information of the device, from among the plurality of questions; outputting the questions apart from the question for which the response to the question can be decided without asking the question, on the basis of the operation history information of the device; receiving the responses to the questions output; and specifying the cause of the defect of the device or the countermeasure for the cause of the defect on the basis of the content of the responses received.

It thereby becomes possible to automatically exclude questions for which responses to the questions are known, on the basis of the operation history, from among the questions to be output, and to reduce the number of questions to be responded to by the user.

An eighth aspect of the present disclosure is a program for specifying a cause of a defect of a device or a countermeasure for the cause of the defect on the basis of responses to a plurality of questions, the program causing a computer to execute the steps of: asking the questions on the basis of operation history information of the device; receiving the responses to the questions asked; and specifying the cause of the defect of the device or the countermeasure for the cause of the defect on the basis of the content of the responses received.

It thereby becomes possible to automatically exclude questions for which responses to the questions are known, on the basis of the operation history, from among the questions to be output, and to reduce the number of questions to be responded to by the user.

A ninth aspect of the present disclosure is a program for specifying a cause of a defect of a device or a countermeasure for the cause of the defect on the basis of responses to a plurality of questions, the program causing a computer to execute the steps of: outputting only necessary questions from the plurality of questions on the basis of operation history information of the device; receiving the responses to the questions output; and specifying the cause of the defect of the device or the countermeasure for the cause of the defect on the basis of the content of the responses received.

It thereby becomes possible to automatically exclude questions for which responses to the questions are known, on the basis of the operation history, from among the questions to be output, and to reduce the number of questions to be responded to by the user.

A tenth aspect of the present disclosure is a program for specifying a cause of a defect of a device or a countermeasure for the cause of the defect on the basis of responses to a plurality of questions, the program causing a computer to execute the steps of: determining whether or not there is a question for which a response to the question can be decided without asking the question, on the basis of operation history information of the device, from among the plurality of questions; outputting the questions apart from the question for which the response to the question can be decided without asking the question, on the basis of the operation history information of the device; receiving the responses to the questions output; and specifying the cause of the defect of the device or the countermeasure for the cause of the defect on the basis of the content of the responses received.

It thereby becomes possible to automatically exclude questions for which responses to the questions are known, on the basis of the operation history, from among the questions to be output, and to reduce the number of questions to be responded to by the user.

Hereinafter, embodiments of the present disclosure will be described with reference to the drawings.

Embodiment 1

FIG. 1 is a configuration diagram of a system in embodiment 1 of the present disclosure.

In FIG. 1, a household electrical appliance 10 is a so-called white good such as a washing machine or an air conditioner, and a washing machine is described as an example in the present embodiment. It should be noted that the household electrical appliance 10 is not restricted to a white good and may be similarly implemented as another electrical device such as an automobile, a vending machine, or a coin-operated washing machine.

A mobile terminal 20 is a mobile terminal such as a smartphone or a mobile telephone device. It should be noted that an electronic device that is not portable such as a television or a home server may be used instead of the mobile terminal 20, or the mobile terminal 20 and the household electrical appliance 10 may be integrated.

The household electrical appliance 10 and the mobile terminal 20 may be connected by means of wireless communication, and may be connected using wireless communication technology such as near field communication (NFC). Therefore, the user of the mobile terminal 20, by holding the mobile terminal 20 toward a specific part of the household electrical appliance 10, is able to perform wireless communication between the mobile terminal 20 and the household electrical appliance 10.

It should be noted that wireless communication technology such as Bluetooth (registered trademark) and radio-frequency identification (RFID) may be used in the present embodiment, although these are considered to be forms of NFC technology in a broad sense.

The mobile terminal 20 is able to connect with a server 30 (information processing device) via a network that uses a public line.

Figure 2:
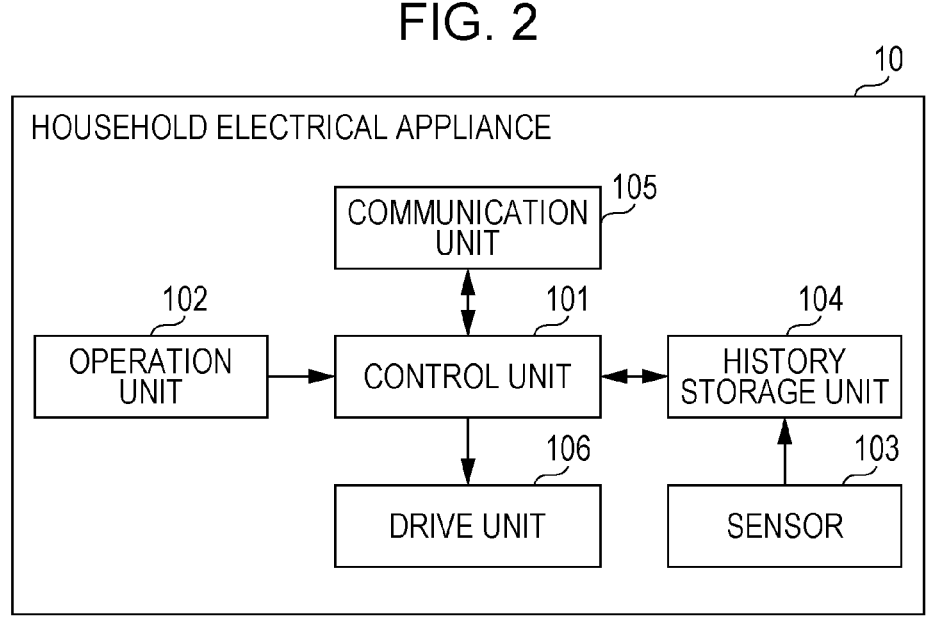
FIG. 2 is a block diagram of a household electrical appliance in embodiment 1 of the present disclosure.

FIG. 2 is a block diagram of the household electrical appliance 10. In FIG. 2, a control unit 101 is made up of a microprocessor such as a central processing unit (CPU), and controls each circuit.

An operation unit 102 is made up of a touch panel and a plurality of keys, for example, and receives operations from the user.

A sensor 103 is made up of a temperature sensor 103, a current sensor 103, an opening/closing detection sensor 103 for detecting the opening and closing of a door, or the like.

A history storage unit 104 is made of a non-volatile memory such as a flash memory, and is able to associate and store a plurality of items of time information and, for example, information input from the operation unit 102 and information detected by the sensor 103.

A communication unit 105 has a function for performing wireless communication with the mobile terminal 20, and is able to perform wireless communication with the mobile terminal 20 using communication technology such as the aforementioned NFC.

A drive unit 106 is a circuit that drives a motor (not depicted) or the like for rotating a drum.

It should be noted that, although not depicted in FIG. 2, a display unit or the like that is made up of a liquid crystal display device, for example, and displays the current operating state of the household electrical appliance 10 or operation instructions or the like for the user is mounted.

Figure 3:
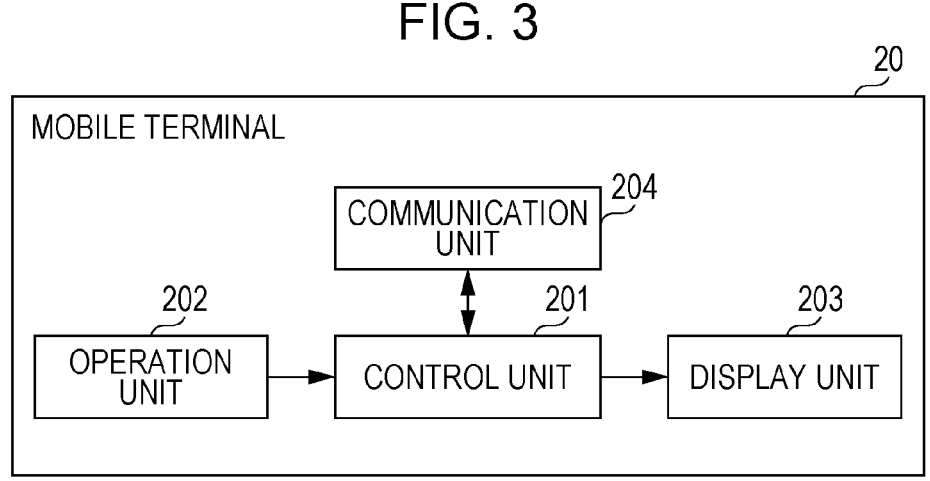
FIG. 3 is a block diagram of a mobile terminal in embodiment 1 of the present disclosure.

FIG. 3 is a block diagram of the mobile terminal 20. In FIG. 3, a control unit 201 is made up of a microprocessor such as a central processing unit (CPU), and controls each circuit.

An operation unit 202 is made up of a touch panel and a plurality of keys, for example, and receives operations from the user.

A display device 203 is made up of a liquid crystal display device, for example, and displays various images, text, and the like.

A communication unit 204 has a function for performing wireless communication with the household electrical appliance 10, and is able to perform wireless communication with the household electrical appliance 10 using communication technology such as the aforementioned NFC.

Furthermore, the communication unit 204 also has a function for performing reception and transmission on the basis of a wireless communication standard such as Long Term Evolution (LTE) or Wireless Fidelity (Wi-Fi) (registered trademark).

Figure 4:
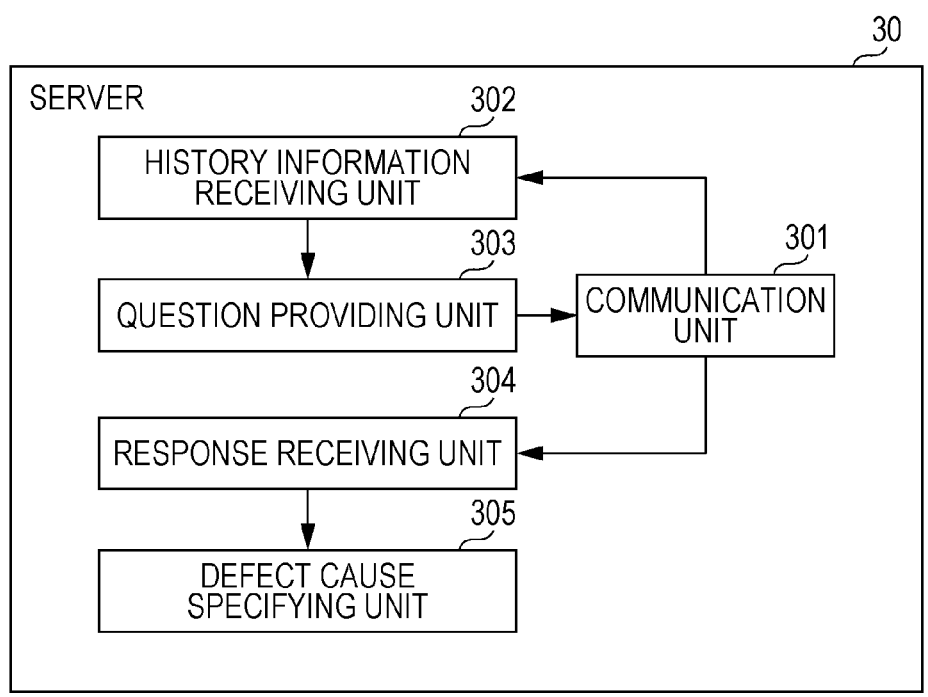
FIG. 4 is a block diagram of a server in embodiment 1 of the present disclosure.

FIG. 4 is a drawing depicting the internal configuration of the server 30. In FIG. 4, a communication unit 301 communicates with the mobile terminal 20 and the like via the network.

A history information receiving unit 302 receives operation history information from the mobile terminal 20.

A question providing unit 303 creates a plurality of questions (a question group) for specifying the cause of a defect of the household electrical appliance 10 or a countermeasure for the cause of the defect. It should be noted that the communication unit 301 is also able to transmit a question group that has been input from the question providing unit 303, to the mobile terminal 20.

A response receiving unit 304 receives responses from the user that are input from the mobile terminal 20 via the communication unit 105.

A defect cause specifying unit 305 specifies the cause of a defect of a device or a countermeasure for the cause of the defect on the basis of the responses received by the response receiving unit 304.

Figure 5:
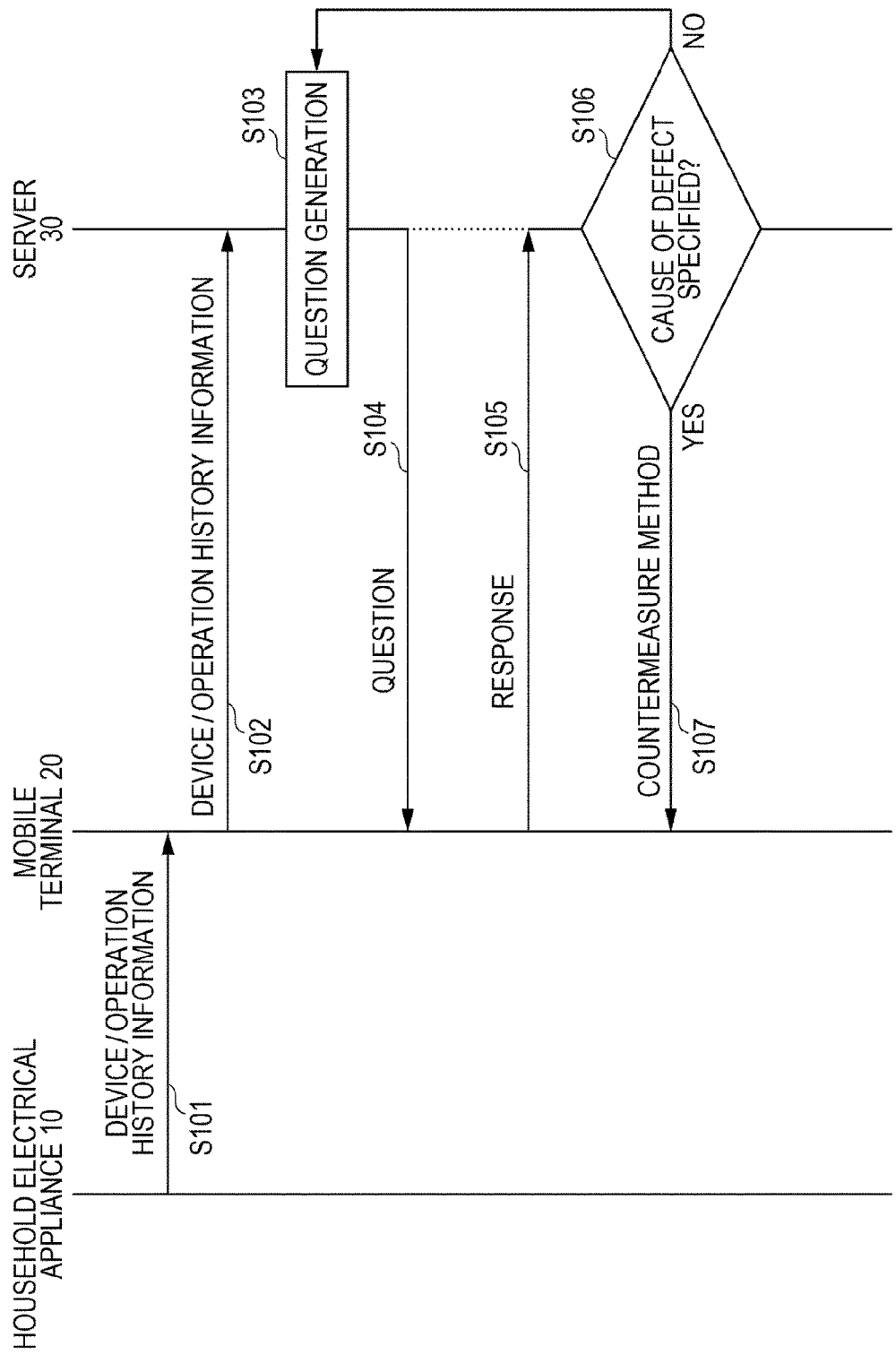
FIG. 5 is a drawing depicting a processing sequence in embodiment 1 of the present disclosure.

FIG. 5 is a sequence diagram depicting an operation in the system of embodiment 1.

An operation of the system of embodiment 1 will be described using the sequence diagram of FIG. 5.

In FIG. 5, when the user has determined that a defect has occurred in the household electrical appliance 10, by activating a specific application of the mobile terminal 20 and then holding the mobile terminal 20 toward the household electrical appliance 10, short-distance communication is performed between the mobile terminal 20 and the household electrical appliance 10, and the mobile terminal 20 acquires operation history information and device information (information such as the type of household electrical appliance or the product number) of the household electrical appliance 10 from the household electrical appliance 10 and, at the same time, transmits information such as the operation history information and the device information to the server 30 via the network.

At the server 30 side, a plurality of questions items for specifying a cause, countermeasure, and the like in relation to the defect are created. However, questions for which responses can be specified on the basis of the operation history information received from the mobile terminal 20 are not transmitted to the mobile terminal 20, and only the remaining other questions are transmitted to the mobile terminal 20.

The user of the mobile terminal 20 responds to those question items using the mobile terminal 20, and those responses are transmitted from the mobile terminal 20 to the server 30.

The server 30 determines the cause of the defect of the household electrical appliance 10, a countermeasure method, or the like on the basis of the received responses, and transmits this information to the mobile terminal 20. Meanwhile, the mobile terminal 20 displays the received information such as the cause of the defect of the household electrical appliance 10 or the countermeasure method, on the display unit. The user of the mobile terminal 20, by looking at this information displayed on the display unit, is able to comprehend content such as the cause of the defect of the household electrical appliance 10 or the countermeasure method.

To describe the operation of the system depicted in FIG. 5 in detail, the control unit 101 of the mobile terminal 20, when having determined that there is a specific application activation instruction and an operation history information acquisition instruction from the operation unit 102, controls the communication unit 105 to thereby implement a wireless connection with the household electrical appliance 10, and the communication unit 105 receives information such as the operation history information from the household electrical appliance 10 (step S101).

Then, the control unit 101 controls the communication unit 105 such that the received information such as the operation history information is transmitted to the server 30 (step S102).

FIG. 6 depicts an example of the operation history information transmitted from the household electrical appliance 10 to the server 30 via the mobile terminal 20. In this example, information indicating the operation mode from when the household electrical appliance 10 was previously driven and information regarding the required time for each drive step and the temperatures of various sensors, for example, is included in addition to the operation history information such as the cumulative number of operations. The server 30 is able to analyze the received operation history information and specify the current state of the device and the way in which the device has been used up to that point in time.

Specifically, for example, the cumulative number of operations is the number of times that a power source for the household electrical appliance 10 has been turned off after having been turned on, the number of times of having been used so to speak, and the cumulative operation time is a cumulative value of the time from the power source for the household electrical appliance 10 having been turned on to having been turned off. The previous operation mode is a standard washing course in the case of a washing machine for example, a step 1 required time is the time used to wash laundry for example, a step 2 required time is the time used to rinse the laundry for example, and a step 3 required time is the time required to dry the laundry for example.

A sensor A temperature is the temperature in the vicinity of a motor of the washing machine for example, and a sensor B temperature is the temperature inside the main body of the washing machine for example.

In FIG. 6, the previous operation mode is stored; however, it should be noted that a history of past operation modes may be stored. In other words, it may be possible to store a plurality of items of information such as the required times for steps 1 to 3 and the temperatures of the sensor 103 in various operation modes in past history.

In FIG. 5, when the communication unit 301 of the server 30 receives the operation history information from the mobile terminal 20, the question providing unit 303 creates only questions that require a response by the user, on the basis of the operation history information received from the communication unit 105 by the history information receiving unit 302 (step S103).

The questions here are inquiries for the user regarding, for example, symptoms of the defect, the way in which the device has been used up to that point in time, the installation location, and the state of the device itself, and are configured as a question group made up of a plurality of questions for each type of device or product number.

Figure 7:
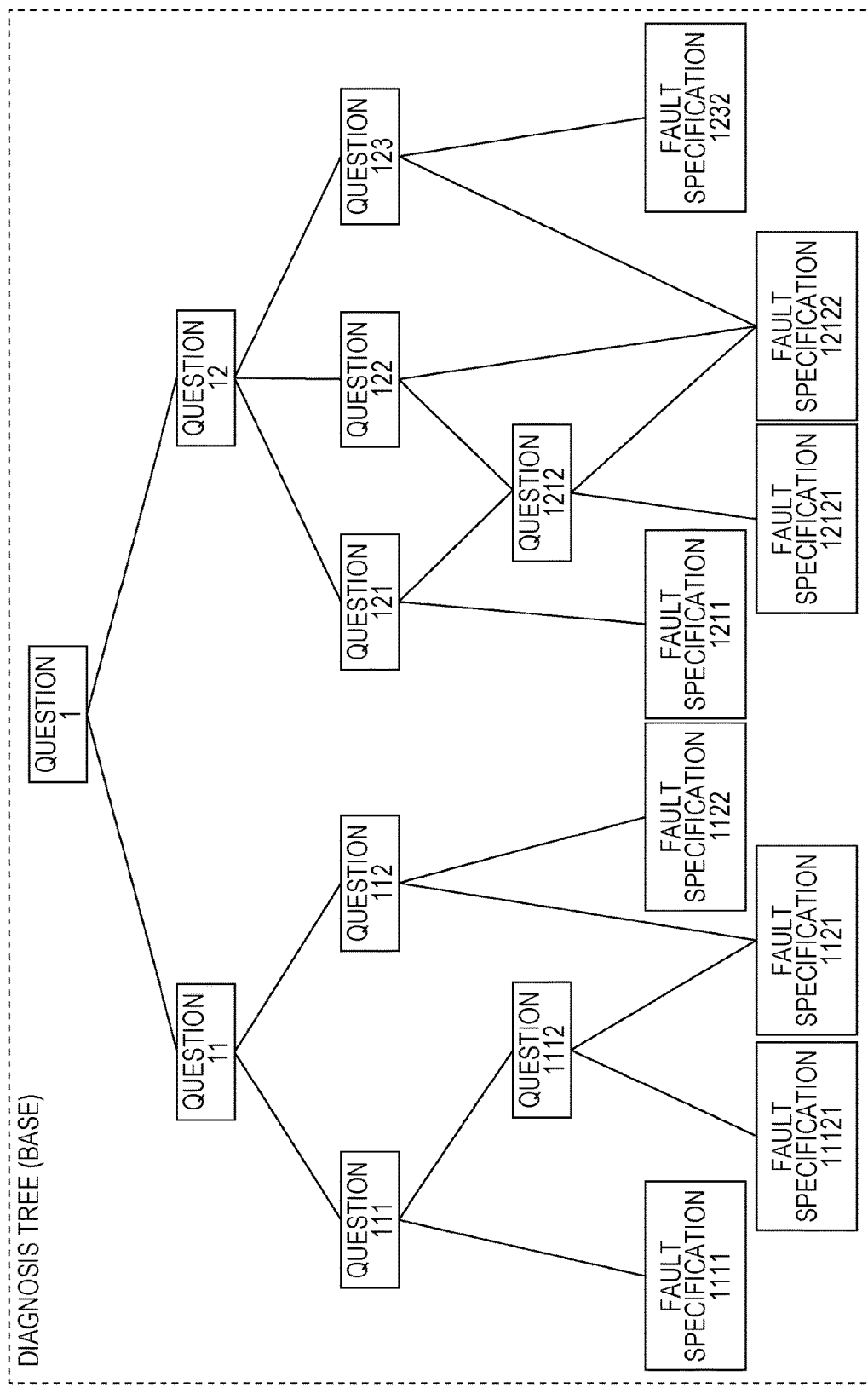
FIG. 7 is a drawing of a question group tree for specifying the cause of a defect.

FIG. 7 is an example depicting the configuration of a question group. The question group is configured of a tree of individual questions. In this case, the server 30 first outputs question 1 to the user and acquires a response. The server 30 decides upon the item to be asked next from the obtained response and outputs question 12, for example.

As a result of the server 30 repeatedly performing this processing, question 122 and question 1212 for example are output and responses thereto are acquired to arrive at defect location specification 12122.

In this case, as a result of the server 30 performing the output of a question and the acquisition of a response thereto four times, information regarding the defect of the household electrical appliance 10, a countermeasure method for example, can be specified, and this result can be transmitted to the mobile terminal 20.

Here, regarding the individual questions, there are cases where it is possible for the server 30 to specify a response to a question from an analysis result of the operation history information of the household electrical appliance 10. For example, the response to a question inquiring about the period from use of the device being started is able to be specified from the example cumulative operation time of the operation history information depicted in FIG. 6, and the response to a question regarding the mode in which the device was last operated is able to be specified from the previous operation mode of the operation history information.

Consequently, for questions for which the server 30 is able to specify responses on the basis of the operation history information, responses are automatically created at the server 30 side. Questions not requiring responses are not transmitted to the mobile terminal 20, and only questions requiring responses are transmitted to the mobile terminal 20.

Figure 8:
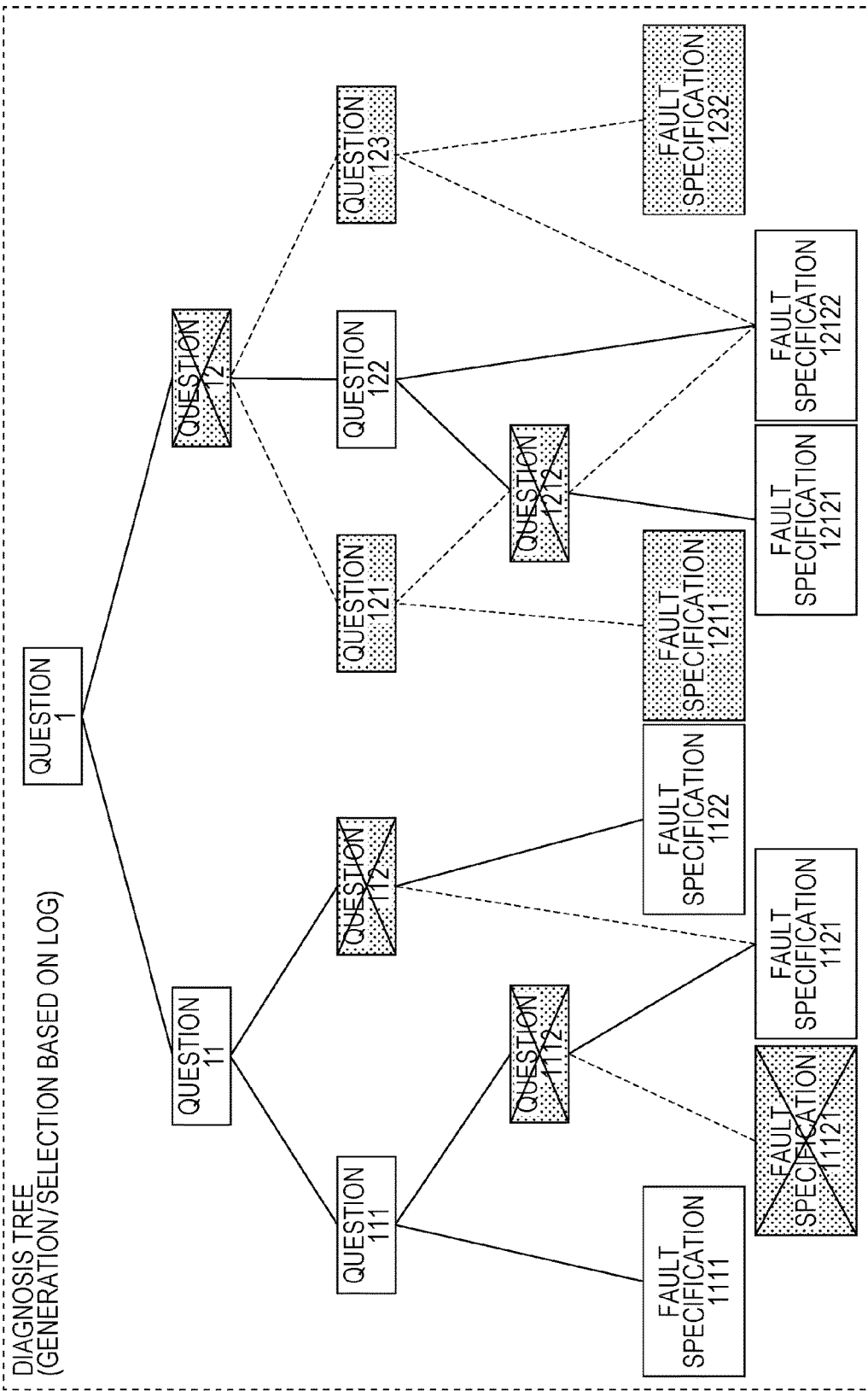
FIG. 8 is a drawing of a tree excluding an unnecessary question portion from the question group of FIG. 7.

FIG. 8 is one example depicting a configuration of a tree in which questions having responses that can be specified from the operation history information have been deleted from within the question group described in FIG. 7.

This example depicts the case where responses to question 12, question 112, question 1112, and question 1212 can be specified from the operation history information. In this case, if the specifying of a defect location via question 1, question 12, question 122, and question 1212 mentioned in the description of FIG. 7 is carried out by means of the tree of FIG. 8, it becomes possible to specify the defect location by only acquiring the responses for question 1 and question 122. That is, the output of a question and the acquisition of a response can be reduced from being carried out four times to two times.

By using this kind of configuration, it becomes possible to reduce the number of responses made by the user of the mobile terminal 20, and it becomes possible to specify the defect location in a smooth manner.

Returning to FIG. 5, the question providing unit 303 of the server 30 creates questions in the aforementioned manner, and questions received by the communication unit 105 from the question providing unit 303 are transmitted to the mobile terminal 20 via the network (step S104).

In the mobile terminal 20, the control unit 201, when having determined that the communication unit 204 has received a question from the server 30, causes the question to be displayed on a display unit 203, and, when having determined that there is a response operation of the user from the operation unit 202, controls the communication unit 204 such that the response is transmitted to the server 30 via the network (step S105).

It should be noted that a configuration is permissible in which responses that have been input from the operation unit 102 are sequentially stored in a storage unit that is not depicted, and the responses are transmitted to the server 30 once a plurality of responses have been obtained, and a configuration is permissible in which a response is transmitted to the server 30 via the communication unit 105 every time a response is input from the operation unit 102 as described above. In the present embodiment, a question is determined at the server 30 side in accordance with the response to the previous question, and therefore a configuration is preferable in which a response is transmitted to the server 30 via the communication unit 105 every time a response is input from the operation unit 102.

The communication unit 105 of the server 30 transmits a response received from the mobile terminal 20 to the response receiving unit 304, and the response receiving unit 304 transmits the received response to the defect cause specifying unit 305.

It should be noted that responses may be transmitted one by one, or a response group that is a collection of a plurality of responses may be transmitted, from the response receiving unit 304 to the defect cause specifying unit 305.

Furthermore, in the present embodiment, reference has been made to a response and a response group; however, hereinafter, a response will be described as being one response or a plurality of responses, and a response group will be described as being made up of a plurality of responses.

The defect cause specifying unit 305 determines whether or not it is possible to specify the cause of the defect of the household electrical appliance 10, a countermeasure method, or the like from the received response (step S106), and, if specifying is possible, transmits the result thereof to the communication unit 105. The communication unit 105 transmits the received information such as the cause of the defect or the countermeasure method to the mobile terminal 20 via the network (step S107). However, if the defect cause specifying unit 305 determines in step S106 that it is not possible to specify the cause of the defect of the household electrical appliance 10, the countermeasure method, or the like from the received response, processing returns to step S103, and a different question is generated.

In step S107, the control unit 201 of the mobile terminal 20, when having determined that the communication unit 204 has received information such as the cause of the defect of the household electrical appliance 10 or a countermeasure method from the server 30 via the network, displays the received information on the display unit 203.

As described above, the question providing unit 303 operates such that unnecessary questions are not output, on the basis of the operation history information received by the history information receiving unit 302 of the server 30, and as a result it becomes possible to alleviate the load of the user who issues responses, and at the same time it becomes possible to shorten the time required to output and display a countermeasure method for the cause of a defect.

It should be noted that a configuration is permissible in which the household electrical appliance 10 and the mobile terminal 20 are connected by means of a wire rather than being wirelessly connected.

Furthermore, in the case where it is possible for the server 30 to specify a response to a question by means of only the operation history information, a configuration is permissible in which the question is not transmitted to the mobile terminal 20, and information such as the cause of the defect of the household electrical appliance 10 or a countermeasure method is transmitted to the mobile terminal 20.

Embodiment 2

Next, embodiment 2 will be described hereinafter. The system configuration and block configuration diagrams for the household electrical appliance 10 and the mobile terminal 20 have the same configurations as in embodiment 1 and have therefore been omitted.

Figure 9:
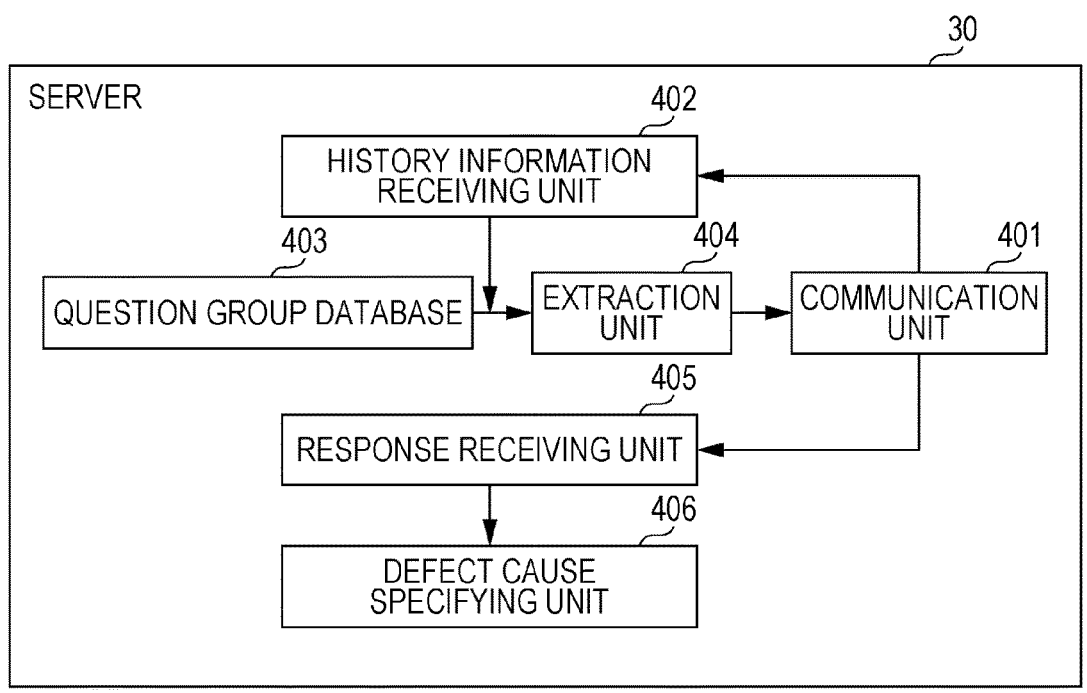
FIG. 9 is a block diagram of a server in embodiment 2 of the present disclosure.

The server 30 is different from that in embodiment 1 and will therefore be described using FIG. 9.

FIG. 9 is a drawing depicting the internal configuration of the server 30. In FIG. 9, a communication unit 401 communicates with the mobile terminal 20 and the like via the network.

A history information receiving unit 402 receives operation history information from the mobile terminal 20.

In FIG. 9, the server 30 has a question group database 403. This question group database 403 has question groups that correspond to a plurality of household electrical appliances 10 such as a refrigerator and a microwave oven as well as the washing machine depicted in FIG. 1.

An extraction unit 404 selects and stores questions for specifying the cause of a defect of a household electrical appliance 10 or a countermeasure for the cause of the defect, from within a question group stored in the question group database 403, on the basis of the operation history information of the history information receiving unit 402. The communication unit 105 transmits the questions stored in the extraction unit 404 to the mobile terminal 20.

A response receiving unit 405 receives responses from the user that are input from the mobile terminal 20 via the communication unit 105.

A defect cause specifying unit 406 specifies the cause of a defect of the device or a countermeasure for the cause of the defect on the basis of the responses received by the response receiving unit 405.

Figure 10:
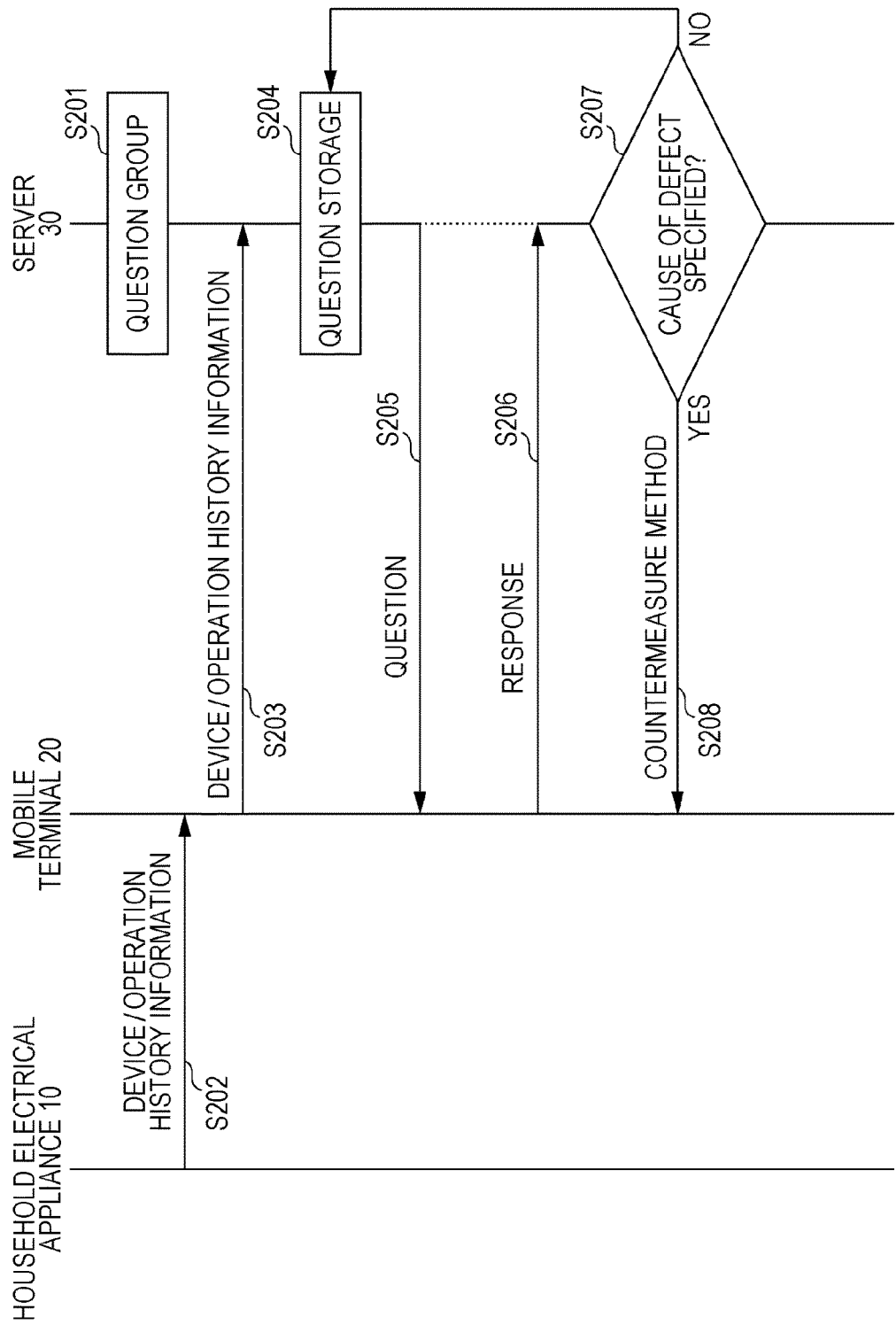
FIG. 10 is a drawing depicting a processing flow in embodiment 2 of the present disclosure.

Next, an operation of the system in embodiment 2 will be described. FIG. 10 is a sequence diagram depicting an operation in embodiment 2.

In FIG. 10, first, a plurality of questions for each type of household electrical appliance 10 are stored in the question group database 403 of the server 30 (step S201).

The control unit 201 of the mobile terminal 20, when having determined that there is a specific application activation instruction and an operation history information acquisition instruction from the operation unit 202, controls the communication unit 204 to thereby implement a wireless connection with a household electrical appliance 10, and the communication unit 204 receives information such as device information (for example, the information and product number of a washing machine, an air conditioner, or the like) and operation history information from the household electrical appliance 10 (step S202). Then, the control unit 201 controls the communication unit 204 such that the received information such as the device information and operation history information is transmitted to the server 30 (step S203).

In FIG. 10, when the communication unit 401 of the server 30 receives the device information and the operation history information from the mobile terminal 20, the extraction unit 404 extracts and stores questions from the question group database 403 on the basis of the device information and the operation history information received by the history information receiving unit 402 from the communication unit 401. For example, if the device information indicates a washing machine, only questions relating to a washing machine are stored in the extraction unit 404, and, in addition, only questions required to specify the cause of the defect are selected on the basis of the operation history information from among the questions for a washing machine and stored in the extraction unit 404 (step S204).

Figure 11:
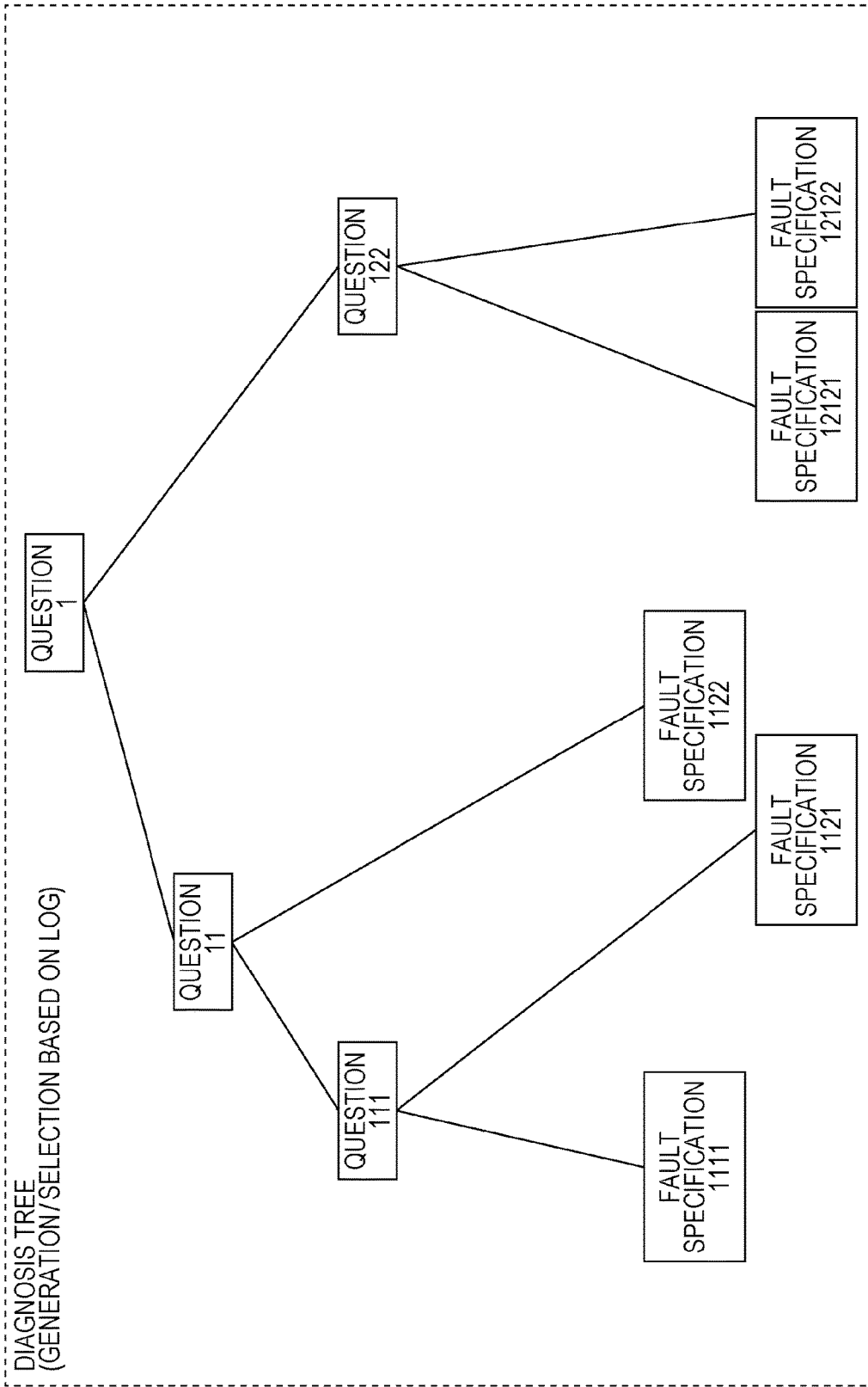
FIG. 11 is a drawing of a question group tree reconfigured from the question group of FIG. 7.

FIG. 11 is one example depicting a configuration of a question group tree in which questions having responses that can be specified from the operation history information have been deleted from within the question group described in FIG. 7 and stored in the extraction unit 404.

In this example, responses to question 12, question 112, question 1112, and question 1212 can be specified from the operation history information, and therefore these questions are deleted from the question group tree in the question group database 403, and the question group tree required to specify the cause of the defect is reconfigured.

By using this kind of configuration, it becomes possible to reduce the number of responses made by the user of the mobile terminal 20, and it becomes possible to specify the defect location in a smooth manner.

Returning to FIG. 10, the question group tree is configured in the aforementioned manner at the server 30 side, and is transmitted to the mobile terminal 20 via the network by the communication unit 105 (step S205).

In the mobile terminal 20, the control unit 101, when having determined that the communication unit 105 has received a question from the server 30, displays the question on a display unit, and, when having determined that there has been a response operation of the user from the operation unit 102, controls the communication unit 105 such that the response is transmitted to the server 30 via the network (step S206).

The communication unit 401 of the server 30 transmits the response received from the mobile terminal 20 to the response receiving unit 405, and the response receiving unit 405 transmits the received response to the defect cause specifying unit 406.

It should be noted that responses may be transmitted one by one, or a response group that is a collection of a plurality of responses may be transmitted, from the response receiving unit 405 to the defect cause specifying unit 406.

Furthermore, in the present embodiment, that which is made up of a plurality of responses is referred to as a response group; however, a response is taken as meaning one response or a plurality of responses.

The defect cause specifying unit 406 determines whether or not it is possible to specify the cause of the defect of the household electrical appliance 10, a countermeasure method, or the like from the received response (step S207), and, if specifying is possible, transmits the result thereof to the communication unit 401. The communication unit 401 transmits the received information such as the cause of the defect or the countermeasure method to the mobile terminal 20 via the network (step S208). However, if the defect cause specifying unit 406 determines in step S106 that it is not possible to specify the cause of the defect of the household electrical appliance 10, the countermeasure method, or the like from the received response, processing returns to step S103, and a different question is generated.

In step S207, the control unit 201 of the mobile terminal 20, when having determined that the communication unit 204 has received information such as the cause of the defect of the household electrical appliance 10 or the countermeasure method from the server 30 via the network, displays the received information on the display unit 203.

As described above, the extraction unit 404 operates such that unnecessary questions are not output, on the basis of information such as the operation history information and device information received by the history information receiving unit 402 of the server 30, and as a result it becomes possible to alleviate the load of the user who issues responses, and at the same time it becomes possible to shorten the time required to output and display the countermeasure method for the cause of a defect.

Embodiment 3

Next, embodiment 3 will be described hereinafter. The system configuration and block configuration diagrams for the household electrical appliance 10 and the mobile terminal 20 have the same configurations as in embodiment 1 and have therefore been omitted.

Figure 12:
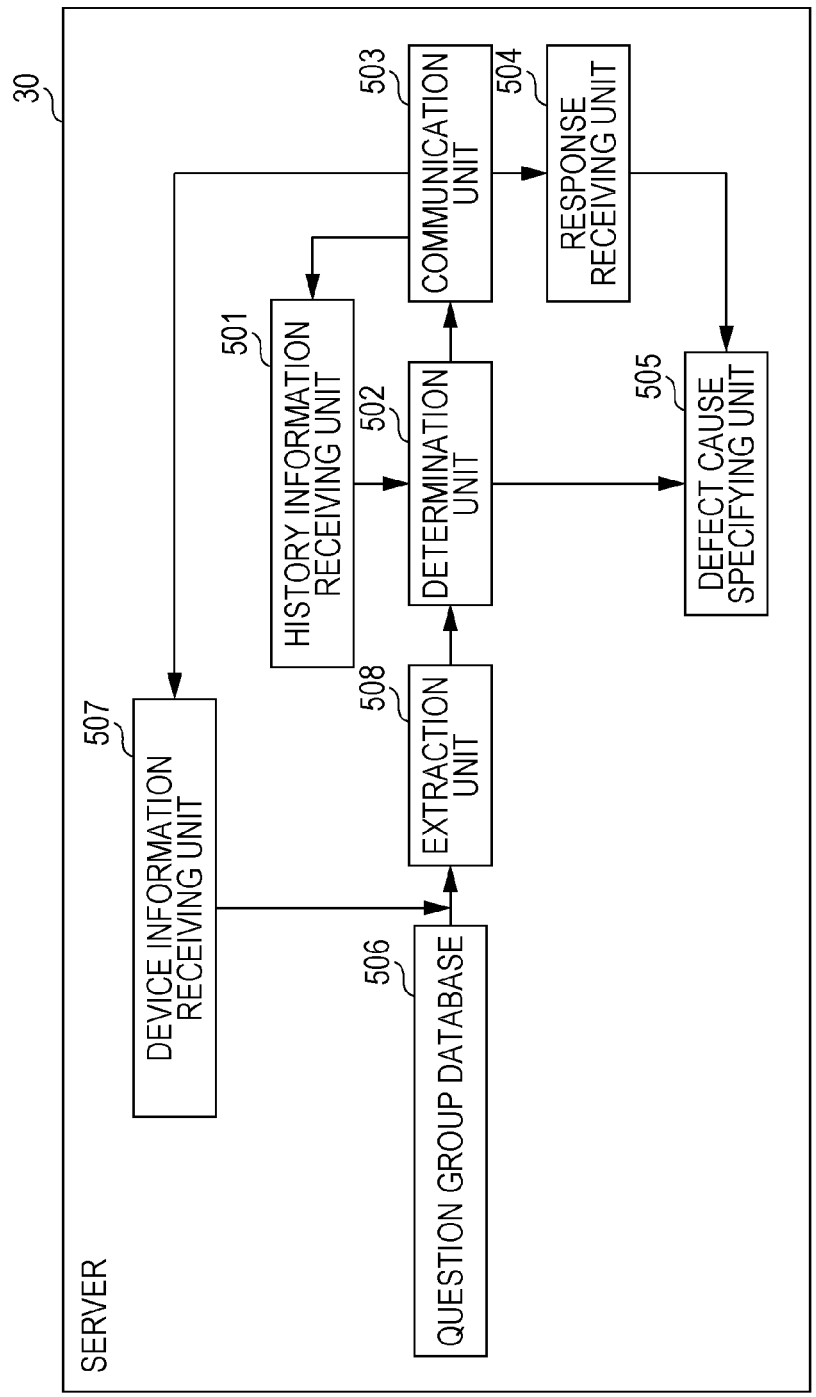
FIG. 12 is a block diagram of a server in embodiment 3 of the present disclosure.

The server 30 is different from that in embodiment 1 and will therefore be described using FIG. 12.

FIG. 12 is a drawing depicting the internal configuration of the server 30. In FIG. 12, a communication unit 503 communicates with the mobile terminal 20 and the like via the network.

A history information receiving unit 501 receives operation history information from the mobile terminal 20.

A determination unit 502 creates questions for specifying the cause of a defect of a household electrical appliance 10 or a countermeasure for the cause of the defect. The communication unit 503 transmits questions that have been input from the determination unit 502 to the mobile terminal 20.

A response receiving unit 504 receives responses from the user that are input from the mobile terminal 20 via the communication unit 503.

A defect cause specifying unit 505 specifies the cause of the defect of the device or a countermeasure for the cause of the defect on the basis of the responses received by the response receiving unit 504.

In FIG. 12, the server 30 has a question group database 506. This question group database 506 has question groups that correspond to a plurality of household electrical appliances 10 such as a refrigerator and a microwave oven as well as the washing machine depicted in FIG. 1.

A device information receiving unit 507 receives information relating to a household electrical appliance 10 that is received from the mobile terminal 20 by the communication unit 105, for example, device information such as the information and product number of a washing machine, an air conditioner, or the like.

An extraction unit 508 extracts questions (a question group) from the questions (question groups) stored in the question group database 506.

Figure 13:
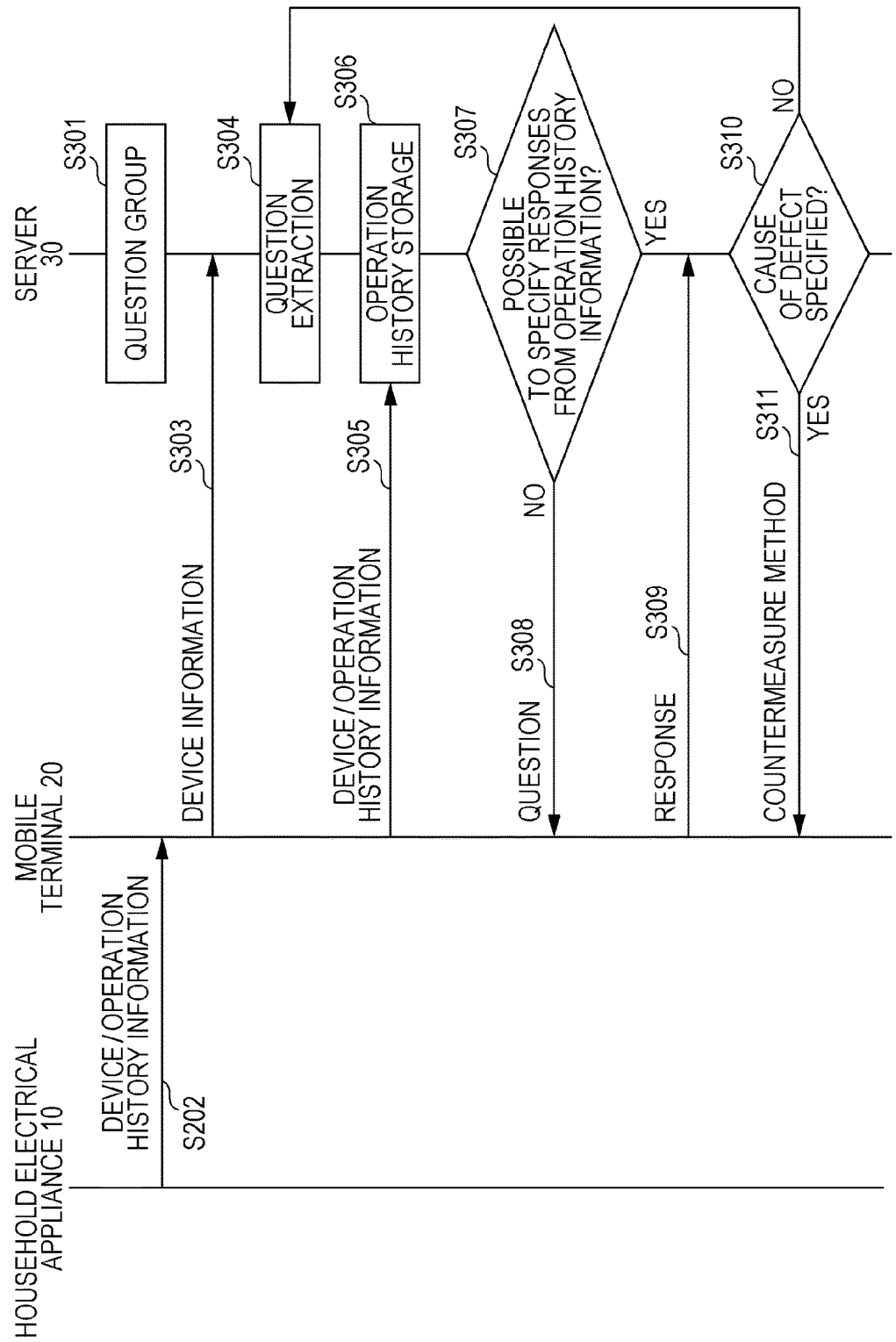
FIG. 13 is a drawing depicting a processing sequence in embodiment 3 of the present disclosure.

Next, an operation of the system in embodiment 3 will be described. FIG. 13 is a sequence diagram depicting an operation in embodiment 3.

In FIG. 13, first, a plurality of questions for each type of household electrical appliance 10 are stored in the question group database 506 of the server 30 (step S301).

The control unit 101 of the mobile terminal 20, when having determined that there is a specific application activation instruction and an operation history information acquisition instruction from the operation unit 102, controls the communication unit 105 to thereby implement a wireless connection with a household electrical appliance 10, and the communication unit 105 receives information such as device information (for example, the information and product number of a washing machine, an air conditioner, or the like) and operation history information from the household electrical appliance 10 (step S302). Then, the control unit 101 controls the communication unit 105 such that the device information is transmitted to the server 30 first from among the received information (step S303).

When the communication unit 503 of the server 30 receives the device information from the mobile terminal 20, on the basis of the device information received from the communication unit 105 by the device information receiving unit 507, the extraction unit 508 selects and stores questions relating to the received device information (for example, a washing machine or a product number) from among the questions stored in the question group database 506. For example, if the device information indicates a washing machine, only questions relating to a washing machine are extracted and stored (step S304).

Then, the communication unit 503 of the server 30 receives the operation history information of the household electrical appliance 10 from the mobile terminal 20 (step S305), and the history information receiving unit 501 stores that operation history information (step S306).

The determination unit 502 determines whether or not responses are possible for the questions stored in the extraction unit 508, on the basis of the operation history information received and stored by the history information receiving unit 501, processing advances to step S310 described hereinafter if responses are possible, and processing advances to step S308 if that is not the case (step S307).

The communication unit 503 of the server 30 transmits a question requiring a response from the user to the mobile terminal 20 via the network (step S308).

In the mobile terminal 20, the control unit 201, when having determined that the communication unit 204 has received a question from the server 30, causes the question to be displayed on the display unit 203, and, when having determined that there is a response operation of the user from the operation unit 202, controls the communication unit 204 such that the response is transmitted to the server 30 via the network (step S309).

The communication unit 503 of the server 30 transmits the response received from the mobile terminal 20 to the response receiving unit 504, and the response receiving unit 504 transmits the received response to the defect cause specifying unit 505.

Responses may be transmitted one by one, or a response group that is a collection of a plurality of responses may be transmitted, from the response receiving unit 504 to the defect cause specifying unit 505; however, it should be noted that the present embodiment is described with responses being transmitted one by one.

The defect cause specifying unit 505 determines whether or not it is possible to specify the cause of the defect of the household electrical appliance 10, a countermeasure method, or the like from the received response (step S310), and, if specifying is possible, transmits the result thereof to the communication unit 503. The communication unit 503 transmits the received information such as the cause of the defect or the countermeasure method to the mobile terminal 20 via the network (step S311). However, if the defect cause specifying unit 505 determines in step S310 that it is not possible to specify the cause of the defect of the household electrical appliance 10, the countermeasure method, or the like from the received response, processing returns to step S304, and a different question is generated.

In step S310, the control unit 201 of the mobile terminal 20, when having determined that the communication unit 503 has received information such as the cause of the defect of the household electrical appliance 10 or the countermeasure method from the server 30 via the network, displays the received information on the display unit 203.

As described above, the extraction unit 508 and the determination unit 502 operate such that unnecessary questions are not output, on the basis of the operation history information received by the history information receiving unit 501 of the server 30 and the device information received by the device information receiving unit 507, and as a result it becomes possible to alleviate the load of the user who issues responses, and at the same time it becomes possible to shorten the time required to output and display a countermeasure method for the cause of a defect.

Embodiment 4

Next, embodiment 4 will be described. In embodiment 1, the household electrical appliance 10 and the server 30 were not connected, and the transmission of information from the household electrical appliance 10 to the server 30 was performed via the mobile terminal 20. In contrast, in embodiment 4, the household electrical appliance 10 is connected to a public network, and it is therefore possible for operation history information of the household electrical appliance 10 to be stored directly in the server 30. Furthermore, it is possible for operation history information to be accumulated in the server 30 at each prescribed time, and therefore operation history information of a longer time period can be acquired and the accuracy of the specification result is improved.

Furthermore, in embodiment 4, it is possible for the configuration and processing sequence of the server 30 to be combined with the embodiments of embodiments 1, 2, and 3.

Figure 14:
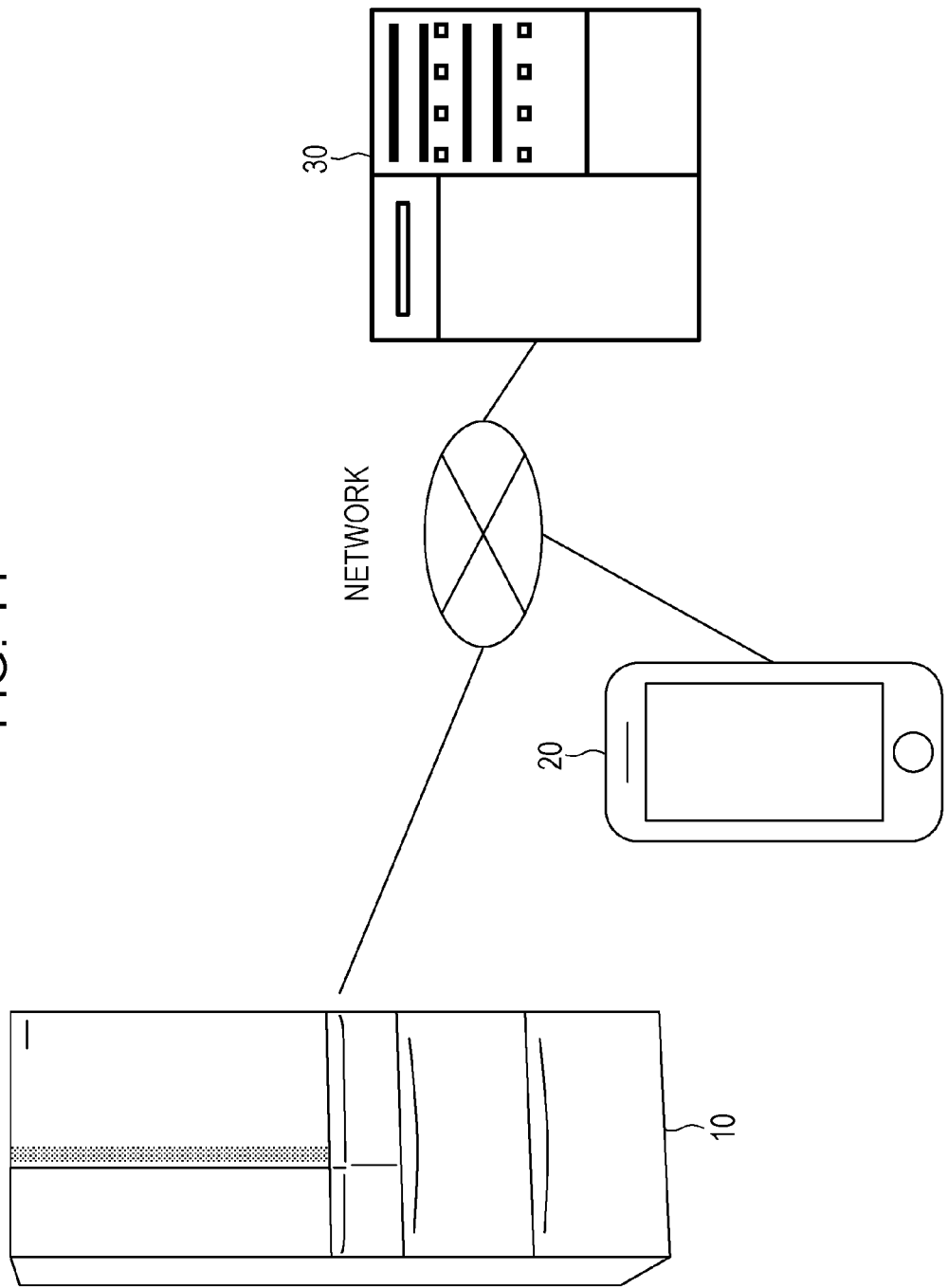
FIG. 14 is a system configuration diagram in embodiment 4 of the present disclosure.

FIG. 14 is a configuration diagram of a system in embodiment 4 of the present disclosure.

As previously mentioned, in FIG. 14, it is possible for the household electrical appliance 10 to be connected to the network by means of a wire or wirelessly, and it is also possible for the mobile terminal 20 and the server 30 to be similarly connected to the network.

Figure 15:
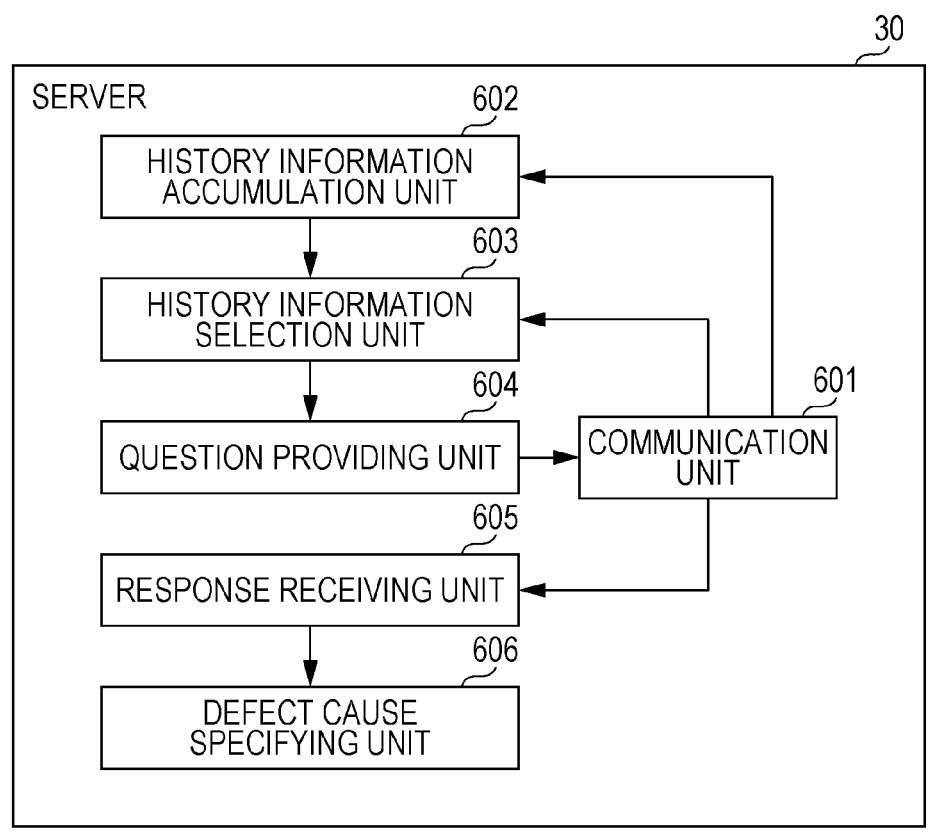
FIG. 15 is a block diagram of a server in embodiment 4 of the present disclosure.

FIG. 15 is a drawing depicting the internal configuration of the server 30. In FIG. 15, a communication unit 601 communicates with the mobile terminal 20 and the like via the network.

A history information accumulation unit 602 receives and stores operation history information from the mobile terminal 20.

A history information selection unit 603 selects operation history information stored in the history information accumulation unit 602.

A question providing unit 604 creates questions for specifying the cause of a defect of the household electrical appliance 10 or a countermeasure for the cause of the defect.

A response receiving unit 605 receives responses from the user that are input from the mobile terminal 20 via the communication unit 105.

A defect cause specifying unit 606 specifies the cause of a defect of the device or a countermeasure for the cause of the defect on the basis of the responses received by the response receiving unit 605.

Figure 16:
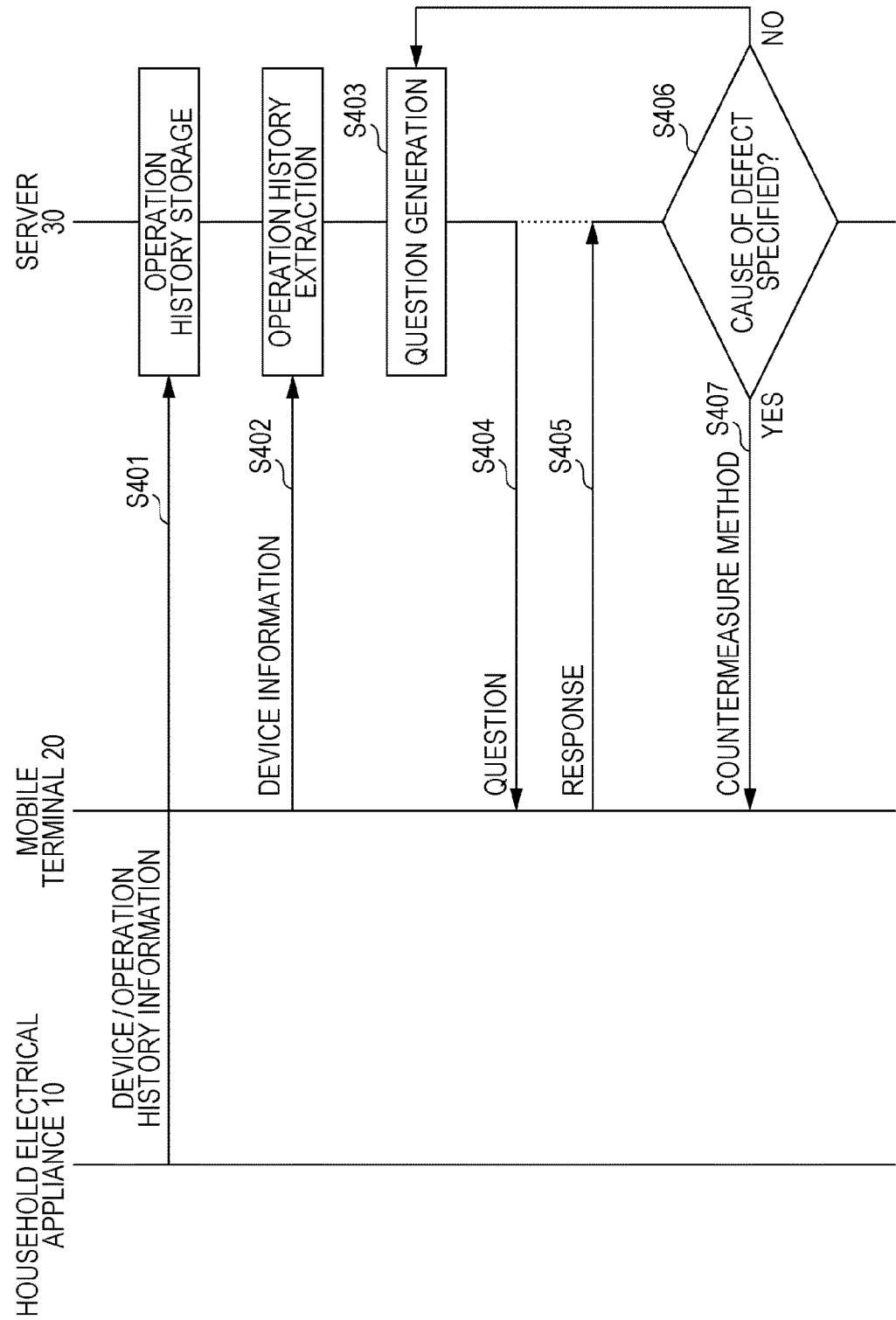
FIG. 16 is a sequence diagram depicting processing in embodiment 4 of the present disclosure.

Next, an operation of the system in embodiment 4 will be described. FIG. 16 is a sequence diagram depicting an operation in embodiment 4.

In FIG. 16, device information and operation history information is transmitted from the household electrical appliance 10 to the server 30 when the household electrical appliance 10 has been driven or at fixed time periods, and this information is stored in the server 30 (step S401).

The control unit 201 of the mobile terminal 20, when having determined that there is a specific application activation instruction and a prescribed operation from the operation unit 202, causes device information of the household electrical appliance 10 to be transmitted to the server 30. Then, the server 30 extracts and stores only operation history information that corresponds to the received device information from the stored operation history information (step S402).

The question providing unit 604 of the server 30 generates a question, and the communication unit 601 transmits that question to the mobile terminal 20 (steps S403 and S404) In the mobile terminal 20, the control unit 201, when having determined that the communication unit 204 has received the question from the server 30, causes the question to be displayed on a display unit 203, and, when having determined that there is a response operation of the user from the operation unit 202, controls the communication unit 204 such that the response is transmitted to the server 30 via the network (step S405). The communication unit 601 of the server 30 transmits the response received from the mobile terminal 20 to the response receiving unit 605, and the response receiving unit 605 transmits the received response to the defect cause specifying unit 606.

Responses may be transmitted one by one, or a response group that is a collection of a plurality of responses may be transmitted, from the response receiving unit 605 to the defect cause specifying unit 606; however, it should be noted that the present embodiment is described with responses being transmitted one by one.

The defect cause specifying unit 606 determines whether or not it is possible to specify the cause of the defect of the household electrical appliance 10, a countermeasure method, or the like from the received response (step S406), and, if specifying is possible, transmits the result thereof to the communication unit 601. The communication unit 601 transmits the received information such as the cause of the defect or the countermeasure method to the mobile terminal 20 via the network (step S407). However, if the defect cause specifying unit 606 determines in step S406 that it is not possible to specify the cause of the defect of the household electrical appliance 10, the countermeasure method, or the like from the received response, processing returns to step S403, and a different question is generated.

In step S407, the control unit 201 of the mobile terminal 20, when having determined that the communication unit 204 has received information such as the cause of the defect of the household electrical appliance 10 or a countermeasure method from the server 30 via the network, displays the received information on the display unit 203.

FIG. 17 is an example of the operation history information stored in the server. A cumulative number of operation days, an interior temperature, a door open/close count, a number of operations, or the like is stored in the server.

It is possible for the present embodiment to be widely applied in servers, systems, or the like for providing a user with a diagnosis of a defect of a household electrical appliance or the like or a countermeasure method for the defect of the household electrical appliance.

What is claimed is:

1. An information processing device, comprising:
a storage that stores questions in a tree form,
a memory that stores instructions; and
a processor that, when executing the instructions stored in the memory, performs operations comprising:
outputting the questions from a root of the tree form to a leaf of the tree form, for specifying a cause of a defect of a device or a countermeasure for the cause of the defect;
receiving responses to the output questions;
specifying the cause of the defect of the device or the countermeasure for the cause of the defect on the basis of the received responses; and
receiving operation history information of the device, wherein
in the outputting the questions from the root of the tree form to the leaf of the tree form, the questions that are to be output are varied, on the basis of the received operation history information, by performing operations including:
determining whether or not the received operation history information includes an answer to a question of the questions stored in the tree form;
prohibiting the question from being output, in response to a determination that the operation history information includes an answer to the question; and
outputting the question, in response to a determination that the operation history information does not include an answer to the question of the questions.

2. The information processing device according to claim 1,
wherein unnecessary questions are prohibited from being output, on the basis of the received operation history information.

3. The information processing device according to claim 1, comprising:
the storage stores the questions corresponding to content of the operation history information.

4. A defect cause specifying method for specifying a cause of a defect of a device or a countermeasure for the cause of the defect, using questions stored in a tree form in a storage, the method including:
determining whether operation history information of the device includes an answer to each of the questions stored in the tree form;
asking the questions from a root of the tree form to a leaf of the tree form, on the basis of the operation history information of the device, by prohibiting a question, of the questions stored in the tree form, from being asked, in response to a determination that the operation history information includes an answer to the question; and asking a question of the questions stored in the tree form, in response to a determination that the operation history information does not include an answer to the question;

receiving responses to the asked questions; and specifying the cause of the defect of the device or the countermeasure for the cause of the defect on the basis of content of the received responses.

5. A defect cause specifying method for specifying a cause of a defect of a device or a countermeasure for the cause of the defect, using questions stored in a tree form in a storage, the method including:

determining whether operation history information of the device includes an answer to each of the questions stored in the tree form;

outputting only necessary questions from the questions stored in the tree form on the basis of operation history information of the device, by:

prohibiting a question of the questions stored in the tree form from being output, in response to a determination that the operation history information includes an answer to the question; and outputting a question of the questions stored in the tree form, in response to a determination that the operation history information does not include an answer to the question;

receiving responses to the output necessary questions; and specifying the cause of the defect of the device or the countermeasure for the cause of the defect on the basis of content of the received responses.

6. A defect cause specifying method for specifying a cause of a defect of a device or a countermeasure for the cause of the defect, using questions stored in a tree form in a storage, the method including:

determining whether or not there is a question, of the questions stored in the tree form, for which a response to the question can be decided without asking the question, on the basis of operation history information of the device, by determining whether or not the operation history information of the device includes an answer to the question;

outputting the question, in response to a determination that the operation history information of the device does not include the answer of the question;

prohibiting the question from being output, in response to a determination that the operation history information of the device includes the answer of the question;

receiving a response to the output question; and specifying the cause of the defect of the device or the countermeasure for the cause of the defect on the basis of content of the received response.

* * * * *